US011936139B2

(12) United States Patent
Kim et al.

(10) Patent No.: US 11,936,139 B2
(45) Date of Patent: Mar. 19, 2024

(54) RECEPTACLE CONNECTOR, PLUG CONNECTOR, AND BOARD-TO-BOARD CONNECTOR HAVING THE SAME

(71) Applicant: Molex, LLC, Lisle, IL (US)

(72) Inventors: Suk Min Kim, Seoul (KR); Jin Hyup Chang, Danwon-gu (KR)

(73) Assignee: MOLEX, LLC, Lisle, IL (US)

( * ) Notice: Subject to any disclaimer, the term of this patent is extended or adjusted under 35 U.S.C. 154(b) by 191 days.

(21) Appl. No.: 17/419,289

(22) PCT Filed: Jan. 10, 2020

(86) PCT No.: PCT/US2020/012999
§ 371 (c)(1),
(2) Date: Jun. 29, 2021

(87) PCT Pub. No.: WO2020/150075
PCT Pub. Date: Jul. 23, 2020

(65) Prior Publication Data

US 2022/0094112 A1 Mar. 24, 2022

(30) Foreign Application Priority Data

Jan. 15, 2019 (KR) ........................ 10-2019-0005169

(51) Int. Cl.
*H01R 12/71* (2011.01)
*H01R 12/70* (2011.01)
*H01R 13/6585* (2011.01)

(52) U.S. Cl.
CPC ....... *H01R 13/6585* (2013.01); *H01R 12/707* (2013.01); *H01R 12/716* (2013.01)

(58) Field of Classification Search
CPC .............. H01R 13/6585; H01R 12/707; H01R 12/716; H01R 13/20; H01R 12/73; H01R 13/6471; H01R 13/24; H01R 13/6461
See application file for complete search history.

(56) References Cited

U.S. PATENT DOCUMENTS

2013/0012074 A1 1/2013 Mashiyama et al.
2013/0078870 A1 3/2013 Milbrand, Jr.
(Continued)

FOREIGN PATENT DOCUMENTS

CN 2882007 Y 3/2007
CN 106058516 A 10/2016
(Continued)

OTHER PUBLICATIONS

International Search Report and Written Opinion received for PCT Application No. PCT/US2020/012999, dated May 7, 2020, 07 Pages.

(Continued)

*Primary Examiner* — Abdullah A Riyami
*Assistant Examiner* — Nelson R. Burgos-Guntin

(57) ABSTRACT

The present disclosure relates to a plug connector and a board-to-board connector, and a receptacle connector connected with a plug connector to electrically connect one pair of boards includes: a receptacle housing including: one pair of sidewall portions protruding along both side borders of a bottom portion facing each other; the other pair of sidewall portions protruding along the other both side borders of the bottom portion facing each other and connected with the one pair of sidewall portions; a center protrusion portion protruding from a center of the bottom portion; and a connection recess portion formed between the one pair of sidewall portions and the other pair of sidewall portions, and the center protrusion portion; a plurality of receptacle terminals coupled along insides of the one pair of sidewall portions, each of the receptacle terminals coming into contact with a terminal of the plug connector through a single contact point; and a receptacle metal shell including: fitting nail portions coupled to the other pair of sidewall portions; a crosstalk blocking portion extended from the fitting nail
(Continued)

portion along the center protrusion portion to separate the receptacle terminals on both sides facing each other, and to block crosstalk; and noise blocking portions coupled to outer surfaces of the one pair of sidewall portions to block an external noise.

17 Claims, 11 Drawing Sheets

(56) References Cited

U.S. PATENT DOCUMENTS

| | | | | |
|---|---|---|---|---|
| 2014/0295705 | A1 | 10/2014 | Lee et al. | |
| 2018/0175561 | A1 | 6/2018 | Chen | |
| 2018/0198241 | A1* | 7/2018 | Ooi | H01R 13/6597 |
| 2018/0198242 | A1 | 7/2018 | Chuang | |
| 2022/0094112 | A1* | 3/2022 | Kim | H01R 12/707 |

FOREIGN PATENT DOCUMENTS

| | | | |
|---|---|---|---|
| CN | 107910676 | A | 4/2018 |
| CN | 108258484 | A | 7/2018 |
| CN | 109088193 | A | 12/2018 |
| JP | 4289606 | B2 | 7/2009 |
| JP | 2012252785 | A | 12/2012 |
| JP | 2015116925 | A | 6/2015 |
| JP | 2018022631 | A | 2/2018 |
| JP | 2018085203 | A | 5/2018 |
| JP | 2018110087 | A | 7/2018 |
| JP | 2018190600 | A | 11/2018 |
| KR | 20150141220 | A | 12/2015 |
| KR | 20160027286 | A | 3/2016 |
| KR | 20170015126 | A | 2/2017 |
| KR | 20170015127 | A | 2/2017 |
| KR | 20170061457 | A | 6/2017 |
| KR | 20170088038 | A | 8/2017 |
| KR | 20170129066 | A | 11/2017 |
| KR | 101814608 | B1 | 1/2018 |

OTHER PUBLICATIONS

Office Action received for JP Application No. 2021-531698, dated Jun. 7, 2022, 8 pages (4 pages of English translation and 4 pages of Official copy).

* cited by examiner

RECEPTACLE CONNECTOR, PLUG CONNECTOR, AND BOARD-TO-BOARD CONNECTOR HAVING THE SAME

RELATED APPLICATIONS

This application is a national phase of International Application No. PCT/US2020/012999, filed Jan. 10, 2020, which claims priority to Korean Application No. 10-2019-0005169 filed on Jan. 15, 2019, which are incorporated by reference in their entireties.

TECHNICAL FIELD

The present disclosure relates to a board-to-board connector.

BACKGROUND ART

As a means for electrically connecting two or more components, the connectors normally used in electric and electronic industry fields are increasingly used with the development of electric and electronic industries.

In particular, when boards are connected with each other, one pair of connectors connected with the respective boards by soldering or the like are used, and these connectors are connected to each other, thereby electrically connecting the boards. A first connector of the one pair of connectors may be a receptacle connector, and a second connector may be a plug connector. The receptacle connector and the plug connector may be formed by arranging terminals on a mold forming portion of an insulating material, and the receptacle connector and the plug connector are connected to each other, forming an electric connector assembly.

The connectors are miniaturized according to the recent trend toward miniaturization of electronic devices, whereas connectors capable of transmitting a huge amount of information rapidly are required according to diversified functions of the electronic devices. However, a miniaturized connector may have a small gap between contact terminals, which cause crosstalk therebetween, and the crosstalk may interfere with high frequency signal transmission. In addition, the connector is required to efficiently block an abnormal signal (noise) generated inside and outside the connector in order to realize high-speed transmission.

SUMMARY

The present disclosure has been developed to solve the above-described problems, and an object of the present disclosure is to provide a board-to-board connector which can realize high-speed transmission by preventing crosstalk generated between contact terminals.

Another object of the present disclosure is to provide a board-to-board connector which enables high-speed transmission by blocking an abnormal signal generated inside and outside the connector.

Still another object of the present disclosure is to provide a board-to-board connector which enhances reliability of a connection between a receptacle connector and a plug connector, and realizes high-speed transmission by minimizing a signal transmission path between contact terminals.

The present disclosure to achieve the above-described objects provides a receptacle connector connected with a plug connector to electrically connect one pair of boards, the receptacle connector including: a receptacle housing including: one pair of sidewall portions protruding along both side borders of a bottom portion facing each other; the other pair of sidewall portions protruding along the other both side borders of the bottom portion facing each other and connected with the one pair of sidewall portions; a center protrusion portion protruding from a center of the bottom portion; and a connection recess portion formed between the one pair of sidewall portions and the other pair of sidewall portions, and the center protrusion portion; a plurality of receptacle terminals coupled along insides of the one pair of sidewall portions, each of the receptacle terminals coming into contact with a terminal of the plug connector through a single contact point; and a receptacle metal shell including: fitting nail portions coupled to the other pair of sidewall portions; a crosstalk blocking portion extended from the fitting nail portion along the center protrusion portion to separate the receptacle terminals on both sides facing each other, and to block crosstalk; and noise blocking portions coupled to outer surfaces of the one pair of sidewall portions to block an external noise.

In addition, the present disclosure to achieve the above-described objects provides a plug connector connected with a receptacle connector to electrically connect one pair of boards, the plug connector including: a plug housing including: one pair of sidewall portions protruding along both side borders of a bottom portion facing each other; the other pair of sidewall portions protruding along the other both side borders of the bottom portion facing each other and connected with the one pair of sidewall portions; and a connection recess portion formed between the one pair of sidewall portions and the other pair of sidewall portions; a plurality of plug terminals coupled along insides of the one pair of sidewall portions, each of the plug terminals coming into contact with a terminal of the receptacle connector through a single contact point; and a plug metal shell including: fitting nail portions coupled to the other pair of sidewall portions; a crosstalk blocking portion extended from the fitting nail portion along the connection recess portion to separate the plug terminals on both sides facing each other, and to block crosstalk; and noise blocking portions coupled to outer surfaces of the one pair of sidewall portions to block an external noise.

In addition, the present disclosure to achieve the above-described objects provides a board-to-board connector which electrically connects a first board and a second board by coupling a receptacle connector and a plug connector. The receptacle connector may include: a receptacle housing including: first sidewall portions protruding along both side borders of a first bottom portion facing each other; second sidewall portions protruding along the other both side borders of the first bottom portion facing each other, and connected with the first sidewall portions; a center protrusion portion protruding from a center of the first bottom portion and having a plate insertion recess formed on a center thereof; and a first connection recess portion formed between the first sidewall portions and the second sidewall portions, and the center protrusion portion; a receptacle metal shell soldered to the first board to fix the receptacle housing to the first board; and a receptacle terminal coupled to a receptacle terminal hole formed on the receptacle housing. The plug connector may include: a plug housing including: third sidewall portions protruding along both side borders of a second bottom portion facing each other; fourth sidewall portions protruding along the other both side borders of the second bottom portion facing each other, and connected with the third sidewall portions; and a second connection recess portion formed between the third sidewall portions and the fourth sidewall portions; a plug metal shell soldered to the second board to fix the plug housing to the second board, and having a first crosstalk blocking portion formed to be inserted into the plate insertion recess; and a plug terminal coupled to the plug housing. When the receptacle connector and the plug connector are coupled to each other, the first crosstalk blocking portion prevents crosstalk between contact terminals arranged to face each other.

Herein, the receptacle metal shell may include a first fitting nail portion coupled to the second sidewall portion to press the second sidewall portion, and first noise blocking portions extended from both sides of the first fitting nail portion to be coupled to the first sidewall portions of an area where the receptacle terminal is positioned. The plug metal shell may include a second fitting nail portion coupled to the fourth sidewall portion to press the fourth sidewall portion, and second noise blocking portions extended from both sides of the second fitting nail portion to be coupled to the third sidewall portions of an area where the plug terminal is positioned.

In addition, the first noise blocking portion and the second noise blocking portion may come into contact with each other when the receptacle connector and the plug connector are coupled to each other.

In addition, a first contact projection is formed on a facing surface of any one of the first noise blocking portion or the second noise blocking portion.

In addition, a contact recess may be formed on a facing surface of the other one of the first noise blocking portion or the second noise blocking portion to receive the first contact projection.

In addition, the receptacle metal shell may further include a second crosstalk blocking portion facing the first crosstalk blocking portion when the receptacle connector and the plug connector are coupled to each other.

In addition, the first crosstalk blocking portion and the second crosstalk blocking portion may come into contact with each other when the receptacle connector and the plug connector are coupled to each other.

In addition, a second contact projection may be formed on a facing surface of any one of the first crosstalk blocking portion or the second crosstalk blocking portion.

In addition, the receptacle metal shell and the plug metal shell may be configured as one pair of separable portions facing each other in the longitudinal direction and separable from each other.

In addition, the receptacle terminal may include a first connection portion coming into contact with the first board, and a first contact portion bent and extended from the first connection portion. The plug terminal may include a second connection portion coming into contact with the second board, and a second contact portion bent and extended from the second connection portion. The first contact portion and the second contact portion may come into contact with each other through a single contact point to form a linear signal transmission path.

The connector of the present disclosure prevents crosstalk generated between contact terminals arranged in the longitudinal direction and facing each other, and thus is advantageous in high-speed transmission of a high frequency signal.

In addition, the connector of the present disclosure can reduce a gap between contact terminals facing each other, and is advantageous in miniaturizing.

In addition, the connector of the present disclosure blocks a noise from the outside, such that high frequency signal transmission can be stably achieved.

In addition, in the connector of the present disclosure, shield plates for blocking crosstalk and a noise form a double structure, and are electrically connected through a plurality of contact terminals, such that crosstalk can be blocked and signals can be discharged rapidly and efficiently.

DETAILED DESCRIPTION OF THE PREFERRED EMBODIMENTS

The present disclosure and the technical objects achieved by embodiments of the present disclosure will be more apparent by preferred embodiments of the present disclosure which will be described below. Hereinafter, preferred embodiments of the present disclosure will be described in detail with reference to the accompanying drawings.

Figure 1:
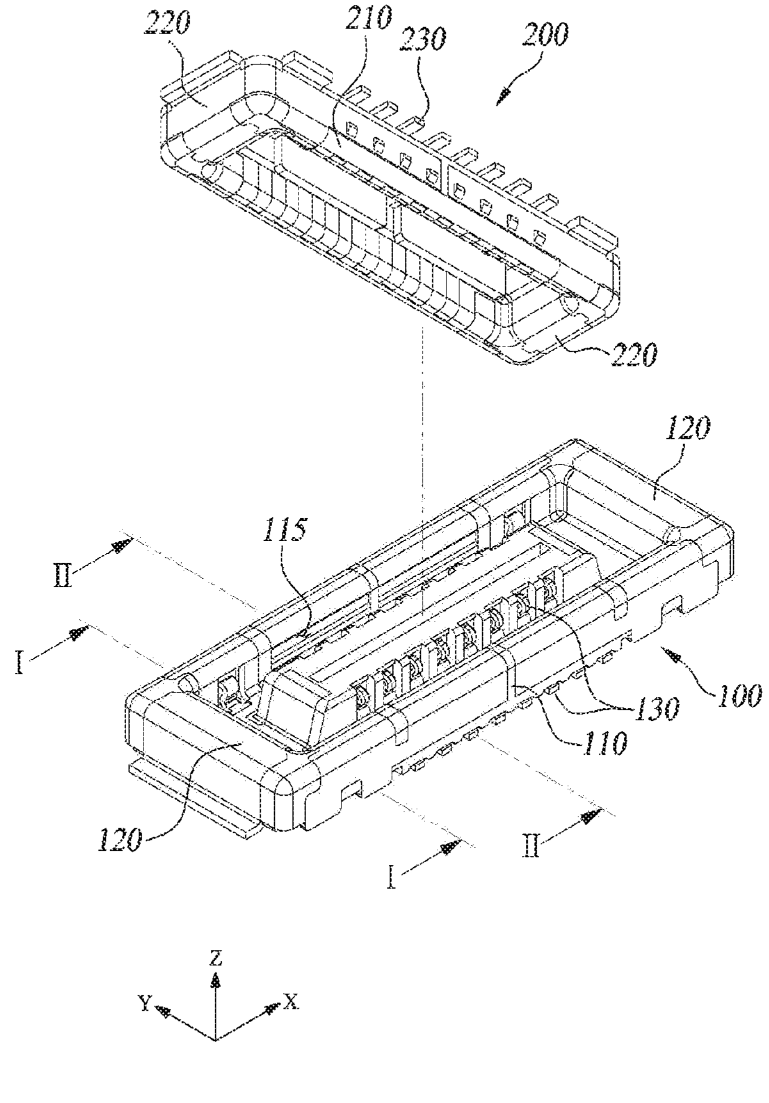
FIG. 1 is an exploded view showing a connector according to the present embodiment.
Figure 2:
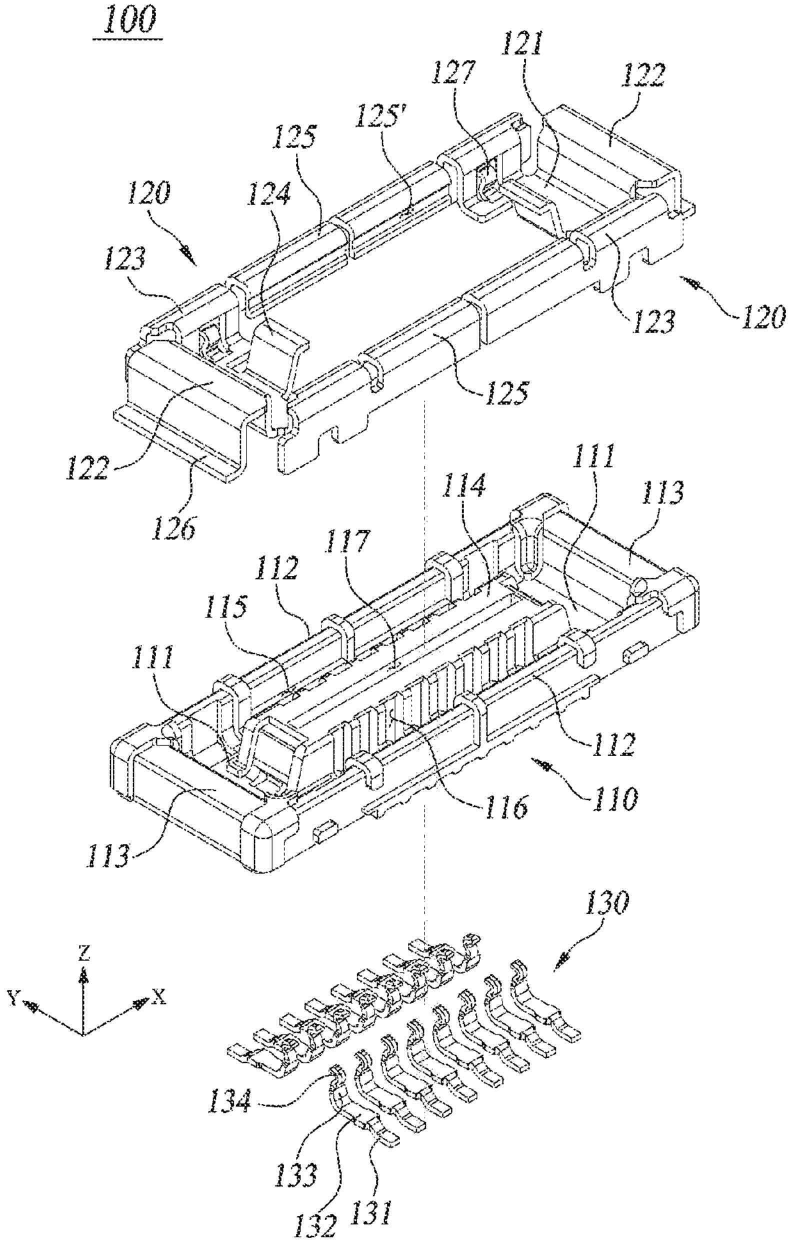
FIG. 2 is an exploded view showing a receptacle connector of FIG. 1.
Figure 3:
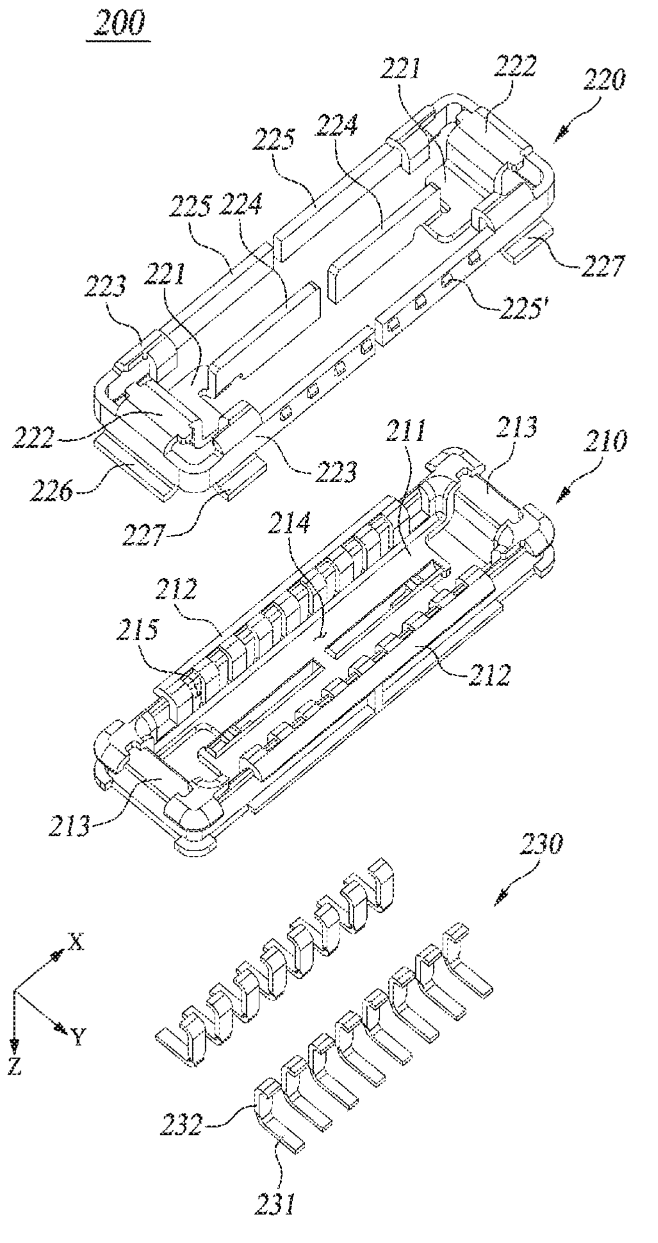
FIG. 3 is an exploded view showing a plug connector of FIG. 1.
Figure 4:
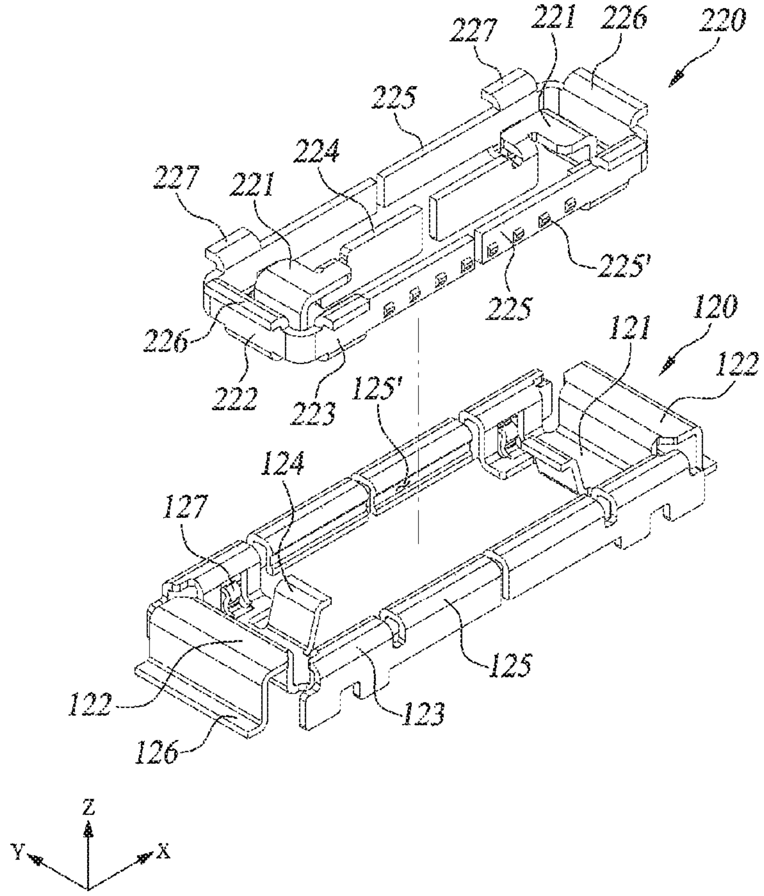
FIG. 4 is an exploded view showing a metal shell of FIG. 1.
Figure 5:
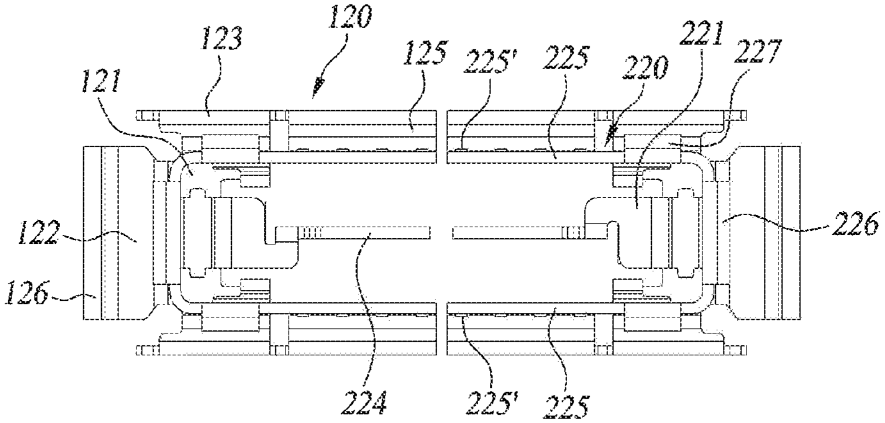
FIG. 5 is a top view showing a connection state of the metal shell of FIG. 4.
Figure 6:
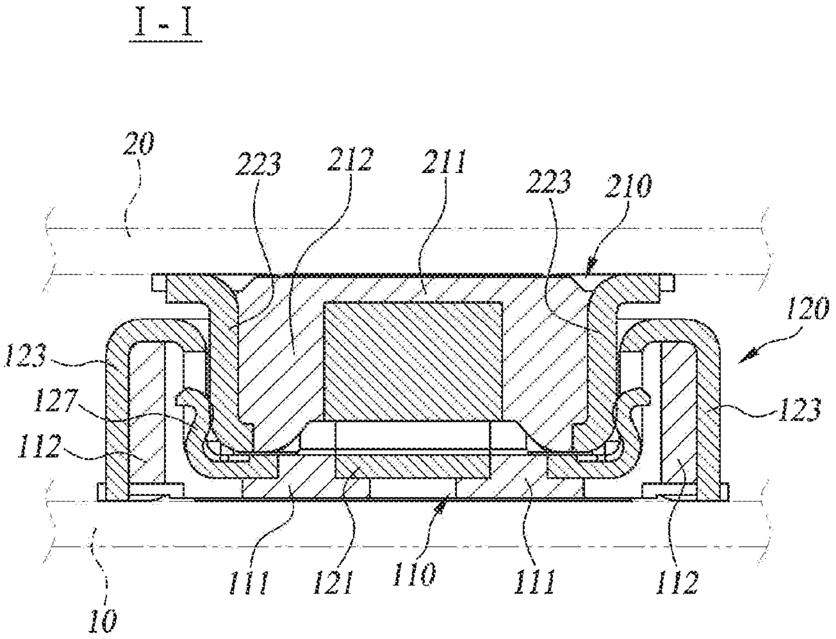
FIGS. 6, 7A and 7B are cross-sectional views showing a connection state of the connector of FIG. 1.
Figure 7A:
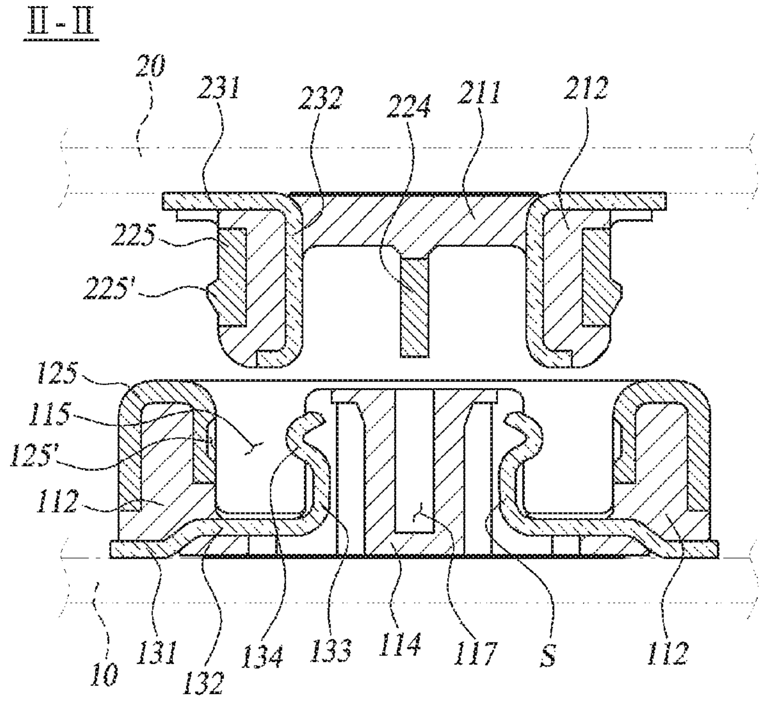
Figure 7B:
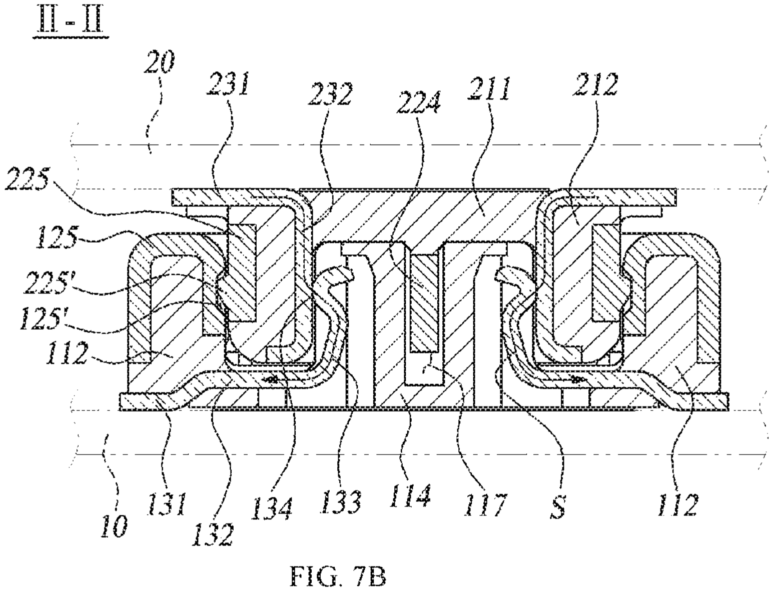
Figure 8:
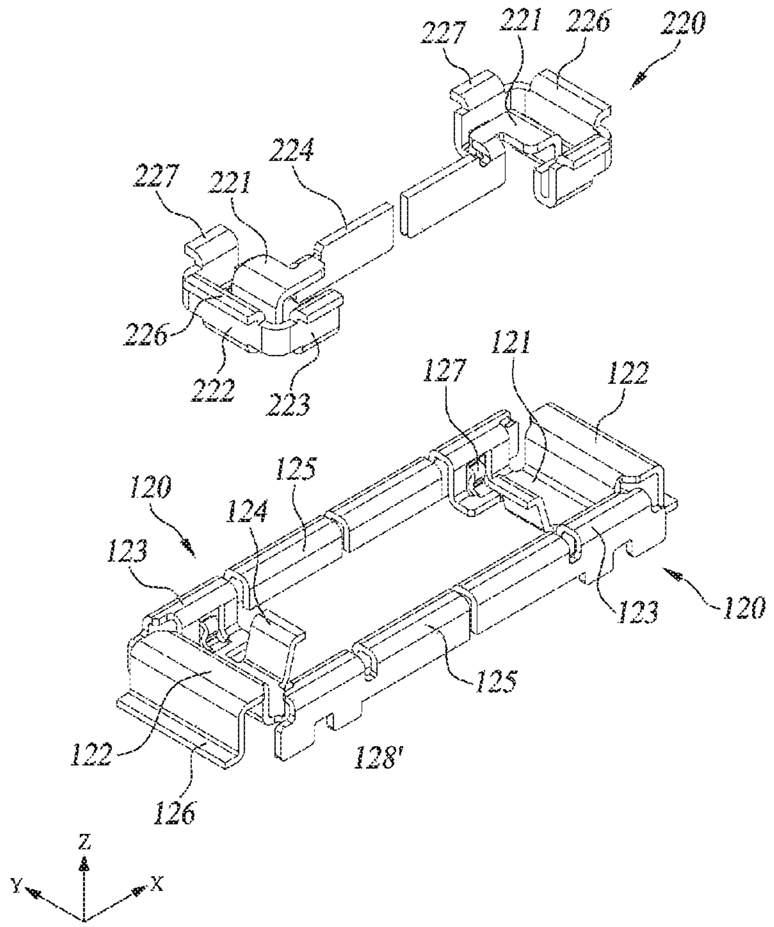
FIG. 8 is an exploded view showing another example of the metal shell of FIG. 1.
Figure 9:
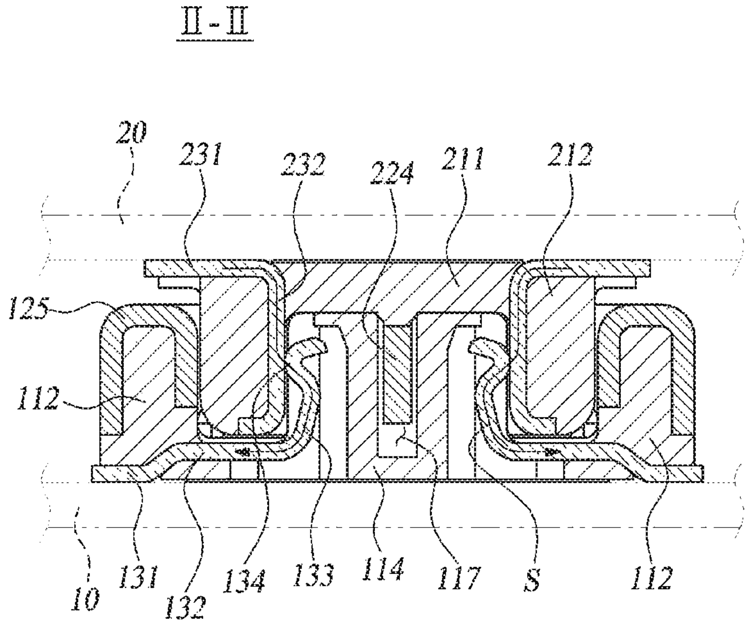
FIG. 9 is a cross-sectional view showing a connection state of the connector to which the metal shell of FIG. 1 is applied.

FIG. 1 is an exploded view showing a connector according to the present embodiment, FIGS. 2 and 3 are exploded views showing a receptacle connector and a plug connector of FIG. 1, FIGS. 4 and 5 are an exploded view showing a metal shell of FIG. 1, and a top view showing a connection state, FIGS. 6, 7A and 7B are cross-sectional views showing a connection state of the connector of FIG. 1, FIG. 8 is an exploded view showing another example of the metal shell of FIG. 1, and FIG. 9 is a cross-sectional view showing a connection state of the connector to which the metal shell of FIG. 8 is applied.

As shown in FIGS. 1 to 7B, the connector according to the present embodiment includes a receptacle connector 100 and a plug connector 200 which is connected to the receptacle connector 100.

The receptacle connector 100 is a first connector mounted on a first board 10 (FIG. 6), and includes a receptacle housing 110, a receptacle metal shell 120 which fixes the receptacle housing 110 to the first board 10 while reinforcing the receptacle housing 110, and a plurality of receptacle terminals 130 arranged in the receptacle housing 110 to be electrically connected to the first board 10.

The receptacle housing 110 may constitute a body of the receptacle connector 100, and may be formed by injecting molding with a resin of an insulating material.

The receptacle housing 110 forms a rectangular parallelepiped shape having a predetermined width and a predetermined length, and includes a first bottom portion 111, one pair of first sidewall portions 112 protruding along both side borders of the first bottom portion 111 in a longitudinal direction (x direction), one pair of second sidewall portions 113 protruding along both side borders of the first bottom portion 111 in a width direction (y direction) and connecting both ends of the first sidewall portions 112, a center protrusion portion 114 spaced apart from the one pair of first sidewall portions 112 and the one pair of second sidewall portions 113, and protruding from a center of the first bottom portion 111 along the longitudinal direction, and a first connection recess portion 115 concavely formed between the center protrusion portion 114, and the one pair of first sidewall portions 112 and the one pair of second sidewall portions 113. The first bottom portion 111, the first sidewall portions 112, the second sidewall portions 113, and the center protrusion portion 114 are integrally connected with one another by injecting molding.

The first sidewall portion 112 and the second sidewall portion 113 are walls having a predetermined thickness, and the one pair of first sidewall portions 112 and the one pair of second sidewall portions 113 facing each other are connected with one another, thereby forming a rectangular wall along the border of the first bottom portion 111.

The center protrusion portion 114 is a wall having a predetermined thickness and protrudes along the longitudinal direction, and receives the receptacle terminals 130. To achieve this, the center protrusion portion 114 has a plurality of receptacle terminal holes 116 formed on both side surfaces thereof along the longitudinal direction to receive the receptacle terminals 130. In addition, the center protrusion portion 114 has a plate insertion recess 117 opened on a center thereof along the longitudinal direction to receive a first crosstalk blocking portion 224 of a plug metal shell 220.

The first connection recess portion 115 receives third sidewall portions 212 and fourth sidewall portions 213 of a plug housing 210 to couple the receptacle connector 100 and the plug connector 200, and is formed in a track or rectangular shape between the center protrusion portion 114, and the first sidewall portions 112 and the second sidewall portions 113.

The receptacle metal shell 120 is soldered to the first board 10 to fix the receptacle housing 110 to the first board 10 while reinforcing hardness of the receptacle housing 110, and to block a noise inside and outside the receptacle connector 100. The receptacle metal shell 120 may be formed by pressing and bending a plate of a conductive member, or may be integrally formed with the receptacle housing 110 by over molding.

The receptacle metal shell 120 includes a first fitting nail portion 122 coupled to the second sidewall portion 113 to press the second sidewall portion 113, one pair of first side reinforcing portions 123 coupled to ends of the first sidewall portions 112, a center reinforcing portion 124 coupled to an end of the center protrusion portion 114, and one pair of first noise blocking portions 125 coupled to the first sidewall portions 112 to block a noise inside and outside the connector. The first fitting nail portion 122, the first side reinforcing portions 123, and the center reinforcing portion 124 may be connected with one another via a first coupling portion 121 of a plate shape.

The first fitting nail portion 122 may cover the second sidewall portion 113 in a bending structure of an inverted U shape, and has one end connected to the first coupling portion 121 and has a first soldering portion 126 extended from the other end thereof in the horizontal direction to be soldered to the first board 10. When the first soldering portion 126 is soldered to the first board 10, the first fitting nail portion 122 fixes the receptacle housing 110 to the first board 10 while reinforcing the second sidewall portion 113.

The first side reinforcing portion 123 covers an end of the first sidewall portion 112 in the inverted U shape, and has one end connected to the first coupling portion 121. The first side reinforcing portion 123 fixes the receptacle housing 110 to the first board 10 while reinforcing the end of the first sidewall portion 112.

The center reinforcing portion 124 covers one end of the first coupling portion 121 in a shape of "¬" and has one end connected to the first coupling portion 121 and the other end coupled to an end of the center protrusion portion 114. The center reinforcing portion 124 prevents the center protrusion portion 114 from colliding with the plug metal shell 220 and from being damaged when the receptacle connector 100 and the plug connector 200 are connected to each other.

The first noise blocking portion 125 is extended from the end of the first side reinforcing portion 123 in the longitudinal direction, that is, along the first sidewall portion 112, and may be formed in the inverted U shape to cover an inner surface and an outer surface of the first sidewall portion 112 in an area where the receptacle terminals 130 are positioned. The first noise blocking portion 125 prevents a noise generated outside from influencing the receptacle terminals 130 by blocking the inside and the outside of the receptacle connector 100.

In addition, the first noise blocking portion 125 has a contact recess 125' formed on an inner surface thereof. The contact recess 125' of the first noise blocking portion 125 receives a first contact projection 225' formed on a second noise blocking portion 225.

The first fitting nail portion 122, the first side reinforcing portions 123, the center reinforcing portion 124, and the first noise blocking portions 125 may be formed by pressing and bending with reference to the first coupling portion 121 of the plate shape. In addition, the first side reinforcing portions 123 may be extended from both sides of the first fitting nail portion 122, and may further have soldering portions formed on outer ends thereof to be mounted on the first board 10.

In addition, in the receptacle metal shell 120, the first noise blocking portions 125 may be extended from both sides of the first coupling portion 121 or the first fitting nail portion 122 without the first side reinforcing portions 123. The receptacle metal shell 120 may have portions integrally connected with one another in the longitudinal direction, or may have one pair of separable portions symmetric to each other with reference to the center in the longitudinal direction and separated from each other. The separable receptacle metal shell 120 is relatively easy to press and bend.

In addition, the receptacle metal shell 120 may further include an elastic projection 127 as a means for detecting a connection with the plug connector 200. The elastic projection 127 may be formed by cutting a part of the first side reinforcing portion 123, and elastically presses a side surface of the plug metal shell 220 when the receptacle connector 100 and the plug connector 200 are connected with each other, as shown in FIG. 6. Accordingly, when the plug metal shell 220 comes into contact with the elastic projection 127, a friction is exerted between the elastic projection 127 and the plug metal shell 220, such that an operator can easily detect the connection between the receptacle connector 100 and the plug connector 200.

The receptacle terminal 130 has one end connected to the first board 10 and the other end connected to a plug terminal 230, thereby electrically connecting the first board 10 and a second board 20 as shown in FIGS. 7A and 7B. The receptacle terminal 130 may be formed by pressing and bending a plate of a conductive member, and may be inserted into the receptacle terminal hole 116 and may be integrally formed with the receptacle housing 110 by over molding.

In addition, the receptacle terminal 130 includes a first connection portion 131 connected to the first board 10, a fixing portion 132 extended from the first connection portion 131 and fixed to the receptacle housing 110, an elastic portion 133 extended upward (z direction) from an end of the fixing portion 132, and a first contact portion 134 convexly protruding from an end of the elastic portion 133 toward the first connection recess portion 115 to come into contact with the plug terminal 230.

The first connection portion 131 may be soldered to the first board 10, such that the receptacle terminal 130 is fixed.

The plug connector 200 is a second connector mounted on the second board 20, and includes a plug housing 210, the plug metal shell 220 for fixing the plug housing 210 to the second board 20 while reinforcing the plug housing 210, and the plurality of plug terminals 230 arranged in the plug housing 210 to be electrically connected to the second board 20.

The plug housing 210 may constitute a body of the plug connector 200, and may be formed by injecting molding with a resin of an insulating material.

The plug housing 210 forms a rectangular parallelepiped shape having a predetermined width and a predetermined length, and includes a second bottom portion 211, one pair of third sidewall portions 212 protruding along both side borders of the second bottom portion 211 in the longitudinal direction, one pair of fourth sidewall portions 213 protruding along both side borders of the second bottom portion 211 in the width direction and connecting both ends of the third sidewall portions 212, and a second connection recess portion 214 formed in a space between the third sidewall portions 212 and the fourth sidewall portions 213. The second bottom portion 211, the third sidewall portions 212, and the fourth sidewall portions 213 are integrally connected with one another by injection molding.

The third sidewall portion 212 and the fourth sidewall portion 213 are walls having a predetermined thickness, and the one pair of third sidewall portions 212 and the one pair of fourth sidewall portions 213 facing each other are connected with one another, thereby forming a rectangular wall along the border of the second bottom portion 211. The third sidewall portion 212 has plug terminal holes 215 formed along the longitudinal direction to receive the plurality of plug terminals 230.

The second connection recess portion 214 receives the center protrusion portion 114 of the receptacle connector 100, thereby coupling the receptacle connector 100 and the plug connector 200.

The plug metal shell 220 is soldered to the second board 20 to fix the plug housing 210 to the second board 20 while reinforcing the plug housing 210, and to block crosstalk generated in the plug terminals 230 or a noise inside and outside the plug connector 200. The plug metal shell 220 may be formed by pressing and bending a plate of a conductive member, or may be integrally formed with the plug housing 210 by over molding.

The plug metal shell 220 includes a second fitting nail portion 222 coupled to the fourth sidewall portion 213, one pair of second side reinforcing portions 223 coupled to ends of the third sidewall portions 212, the first crosstalk blocking portions 224 to block crosstalk between the plug terminals 230, and one pair of second noise blocking portions 225 coupled to the third sidewall portions 212 to block a noise inside and outside the connector. The second fitting nail portion 222 and the first crosstalk blocking portion 224 may be connected with each other via a second coupling portion 221 of a plate shape, and the second side reinforcing portions 223 may be connected to both sides of the second fitting nail portion 222.

The second fitting nail portion 222 may cover the fourth sidewall portion 213 in a bending structure of an inverted U shape, and has one end connected to the second coupling portion 221 and has a second soldering portion 226 extended from the other end thereof in the horizontal direction to be soldered to the second board 20.

The second side reinforcing portion 223 covers an end of the third sidewall portion 212 in the bending structure of the inverted U shape, and is coupled to the end of the third sidewall portion 212. The second side reinforcing portion 223 may have a third soldering portion 227 extended from an external end thereof in the horizontal direction to be soldered to the second board 20, and may have one end connected to the second coupling portion 221.

The second soldering portion 226 and the third soldering portion 227 are soldered to the second board 20 to fix the plug housing 210 to the second board 20, and the second fitting nail portion 222 and the second side reinforcing portions 223 reinforce the fourth sidewall portion 213 and the third sidewall portions 212.

The first crosstalk blocking portion 224 has a plate shape in the vertical direction and is extended from an inner end of the second coupling portion 221. The first crosstalk blocking portion 224 divides the second connection recess portion 214 into both sides in the longitudinal direction. As a result, the first crosstalk blocking portion 224 separates the plug terminals 230 on both sides, which are coupled to the one pair of third sidewall portions 212 facing each other, and blocks crosstalk generated between the opposite plug terminals 230. The first crosstalk blocking portion 224 is inserted into the plate insertion recess 117 of the receptacle housing 110 when being coupled with the receptacle connector 100.

The second noise blocking portion 225 is extended from an end of the second side reinforcing portion 223 in the longitudinal direction, that is, along the third sidewall portion 212, and is coupled to an outer surface of the third sidewall portion 212 in an area where the plug terminals 230 are positioned. The second noise blocking portion 225 blocks the inside and the outside of the plug connector 200, and prevents a noise generated outside from influencing the plug terminals 230.

In addition, the second noise blocking portion 225 has a first contact projection 225' formed on a surface thereof. The first contact projection 225' is received in the contact recess 125' of the first noise blocking portion 125. In this case, when the receptacle connector 100 and the plug connector 200 are coupled to each other, the first contact projection 225' comes into contact with the contact recess 125' to electrically connect the first noise blocking portion 125 and the second noise blocking portion 225, and enables the noise absorbed into the first noise blocking portion 125 and the second noise blocking portion 225 to be rapidly discharged through the first soldering portion 126, the second soldering portion 226, and the third soldering portion 227.

In addition, the first contact projection 225' of the second noise blocking portion 225 presses a surface of the first noise blocking portion 125 during a coupling process between the receptacle connector 100 and the plug connector 200, and is seated and received in the contact recess 125' when the coupling is completed. When the first contact projection 225' comes into contact with the first noise blocking portion 125 in this process, a strong friction is exerted, but the friction is abruptly reduced when the first contact projection 225' is seated in the contact recess 125', such that completion of the coupling between the receptacle connector 100 and the plug connector 200 can be easily detected. Accordingly, the first contact projection 225' of the second noise blocking portion 225 and the contact recess 125' of the first noise blocking portion 125 corresponding thereto enable an operator to easily detect completion of the connection of the connector.

In the present embodiment, it is illustrated that the first contact projection 225' is formed on the second noise blocking portion 225, and the contact recess 125' is formed on the first noise blocking portion 125, but the first contact projection 225' may be formed on the first noise blocking portion 125 and the contact recess 125' may be formed on the second noise blocking portion 225.

The second fitting nail portion 222, the second side reinforcing portions 223, the first crosstalk blocking portion 224, and the second noise blocking portion 225 may be formed by pressing and bending with reference to the second coupling portion 221 of the plate shape.

In addition, in the plug metal shell 220, the second noise blocking portions 225 may be extended from both sides of the first fitting nail portion 122 or the second coupling portion 221 without the second side reinforcing portions 223. The plug metal shell 220 may have portions integrally connected with one another in the longitudinal direction, or may have one pair of separable portions symmetric to each other with reference to the center in the longitudinal direction and separated from each other.

The plug terminal 230 has one end connected to the second board 20 and the other end coming into contact with the receptacle terminal 130 when being connected with the receptacle connector 100, and electrically connects the first board 10 and the second board 20 as shown in FIGS. 7A and 7B. The plug terminal 230 may be formed by pressing and bending a plate of a conductive member, or may be integrally formed with the plug housing 210 by over molding.

In addition, the plug terminal 230 includes a second connection portion 231 which comes into contact with the second board 20, and a second contact portion 232 extended upward (−z direction) from the second connection portion 131 to be fixed to the plug housing 210 and to come into contact with the receptacle terminal 130. The second contact portion 232 elastically comes into contact with the first contact portion 134 of the receptacle terminal 130 having elasticity, thereby achieving a stable electric connection between the receptacle connector 100 and the plug connector 200.

Referring to a connection state between the receptacle connector 100 and the plug connector 200 with reference to FIGS. 7A and 7B, the receptacle terminal 130 and the plug terminal 230 are arranged on both sides with reference to the center protrusion portion 114 of the receptacle housing 110 in the longitudinal direction. In this case, the first contact portion 134 of the receptacle terminal 130 protrudes toward a space of the first connection recess portion 115 due to the elastic portion 133 before the plug connector 200 is coupled (see FIG. 7A), and is pushed by elasticity of the elastic portion 133 after the plug connector 200 is coupled, and comes into contact with the second contact portion 232 (see FIG. 7B).

In this case, in the plug connector 200, the terminal is formed only inside the third sidewall portion 212, and forms a signal transmission path with only one contact point, and a substantially liner signal transmission path S is formed between the receptacle terminal 130 and the plug terminal 230. Accordingly, a signal is transmitted through a shortest path S through one contact point, such that high-speed transmission is possible.

In addition, the first crosstalk blocking portion 224 is positioned between the receptacle terminals 130 and the plug terminals 230 which are arranged on both sides along the longitudinal direction with reference to the center protrusion portion 114. Accordingly, crosstalk is blocked between the receptacle terminals 130 and the plug terminals 230 in the longitudinal direction, and signal transmission is not interfered with. Therefore, high-frequency signal transmission can be stably achieved. In addition, a gap between the receptacle terminal 130 and the plug terminal 230 in the longitudinal direction can further be reduced by the first crosstalk blocking portion 224. Therefore, the connector can be miniaturized.

In addition, the connector of the present embodiment forms a shield outside the third sidewall portion 212 to block a noise, such that the connector is more advantageous in miniaturizing. Specifically, the first noise blocking portion 125 and the second noise blocking portion 225 are positioned on both sides of the receptacle connector 100 and the plug connector 200. Accordingly, since an external noise is prevented from interfering with the receptacle terminal 130 and the plug terminal 230, high-frequency signal transmission can be stably achieved. In addition, the first noise blocking portion 125 by the receptacle metal shell 120 and the second noise blocking portion 225 by the plug metal shell 220 form a double structure and come into contact with each other via the first contact projection 225'. Therefore, noises absorbed into the noise blocking portions can be rapidly discharged through any one of the first noise blocking portion 125 or the second noise blocking portion 225 or both the blocking portions.

The noise blocking portion may be formed only on any one of the receptacle metal shell or the plug metal shell, and it is illustrated in an embodiment of FIGS. 8 and 9 that the noise blocking portion is formed on the receptacle metal shell.

In the connector of the present embodiment, the first noise blocking portion 125 formed on the receptacle metal shell 120 prevents an external noise from interfering with the contact terminals of the receptacle terminals 130 or the plug terminals 230. In this case, since the first noise blocking portion 125 is formed in the inverted U shape to cover the inner surface and the outer surface of the first sidewall portion 112, the first noise blocking portion 125 itself forms a double structure and can efficiently block a noise.

Figure 10:
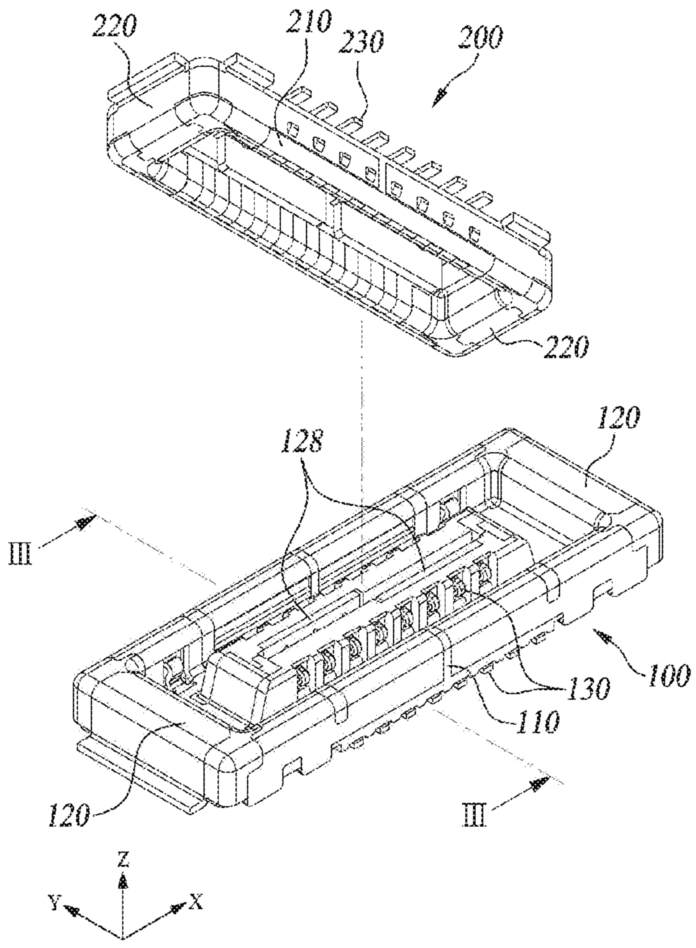
FIG. 10 is an exploded view showing another implementation example of the connector according to the present embodiment.
Figure 11:
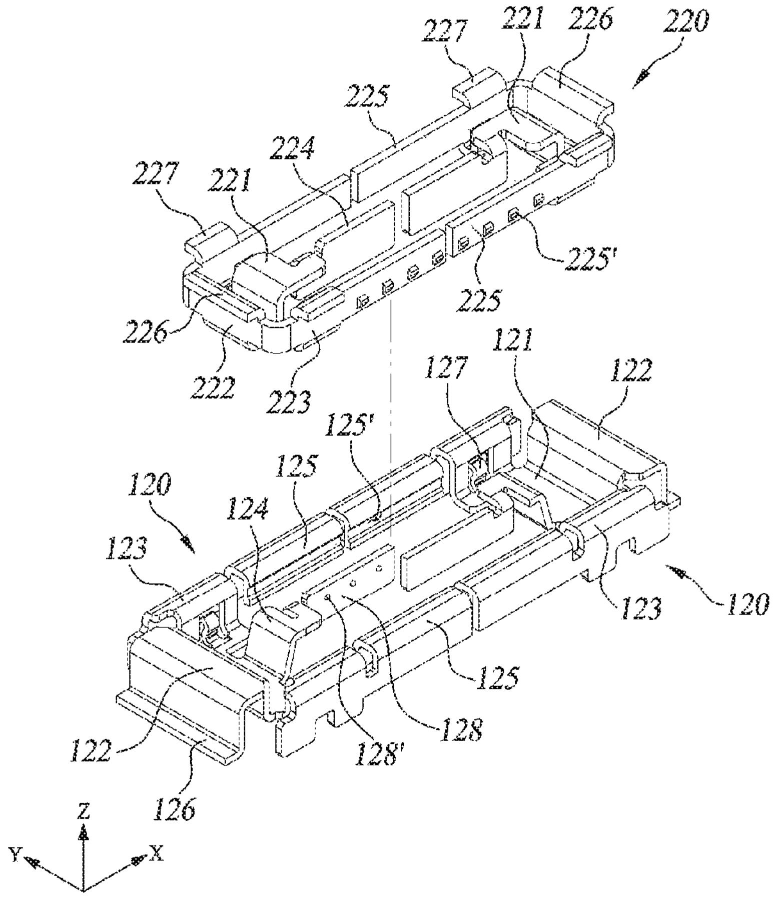
FIG. 11 is an exploded view showing a metal shell of FIG. 10.
Figure 12:
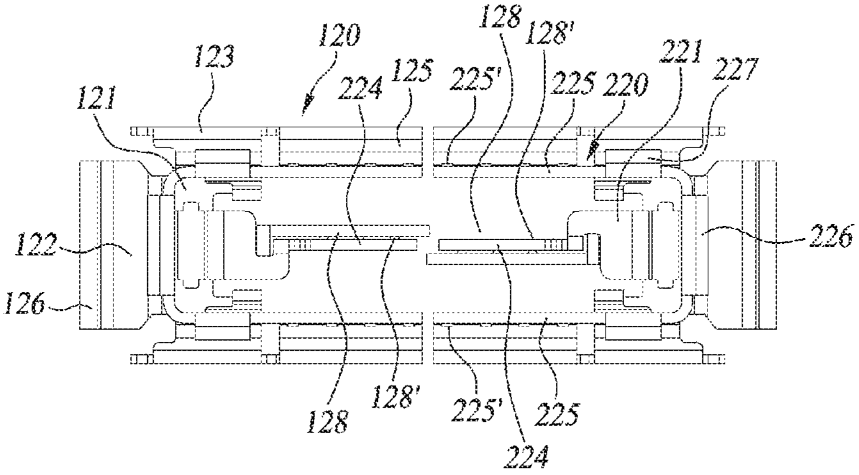
FIG. 12 is a top view showing a connection state of the metal shell of FIG. 10.
Figure 13:
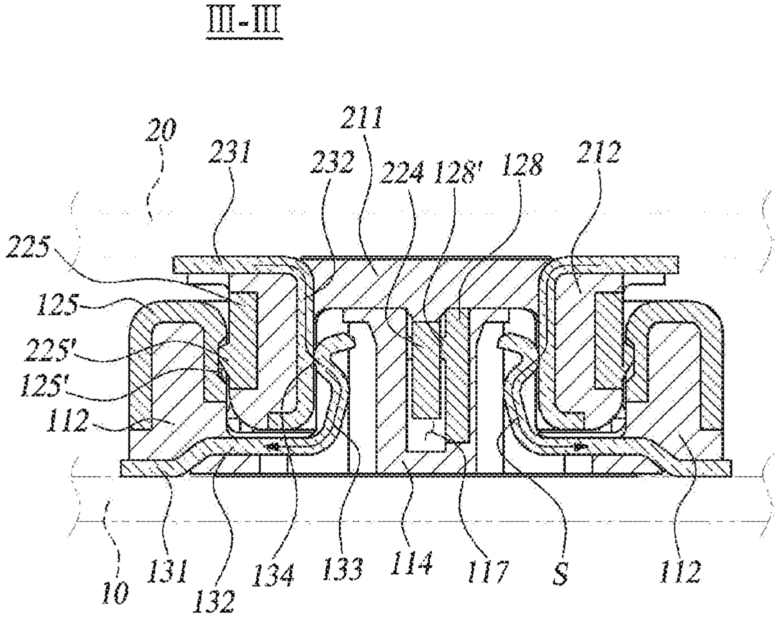
FIG. 13 is a cross-sectional view showing a connection state of the connector of FIG. 10.

FIG. 10 is an exploded view showing another implementation example of the connector according to the present embodiment, FIGS. 11 and 12 are an exploded view showing a metal shell of FIG. 10 and a top view showing a connection state, and FIG. 13 is a cross-sectional view taken on line of FIG. 10, showing the connection state of the connector of FIG. 10.

As shown in the drawings, in the connector of the present implementation example, the receptacle metal shell 120 includes a second crosstalk blocking portion 128. The second crosstalk blocking portion 128 has a plate shape in the vertical direction and is extended from an inner end of the first coupling portion 121 in the longitudinal direction. In this case, the second crosstalk blocking portion 128 is formed on a position slightly misaligned from the center not to collide with the first crosstalk blocking portion 224 linearly disposed when the plug connector 200 is coupled. The second crosstalk blocking portion 128 may be preferably disposed to be in surface contact with the first crosstalk blocking portion 224 when the plug connector is connected.

In addition, the second crosstalk blocking portion 128 may have a second contact projection 128' formed on a surface thereof facing the first crosstalk blocking portion 224. The second contact projection 128' reinforces contact between the first crosstalk blocking portion 224 and the second crosstalk blocking portion 128, and the first crosstalk blocking portion 224 and the second crosstalk blocking portion 128 are electrically connected with each other. In this case, a contact recess may be formed on the surface of the first crosstalk blocking portion 224 to correspond to the second contact projection 128'. In addition, the second contact projection 128' may be formed on one surface of the first crosstalk blocking portion 224.

Referring to FIG. 13, the second crosstalk blocking portion 128 forms a double structure along with the first crosstalk blocking portion 224, and is positioned between the contact terminals separated on both sides, and prevents crosstalk between the contact terminals, such that the connector of the present embodiment can stably achieve high-frequency signal transmission.

It is illustrated that, in the connector of the present embodiment, the crosstalk blocking portion is disposed on the plug connector or both the plug connector and the receptacle connector. However, the crosstalk blocking portion may be disposed only on the receptacle connector. That is, the crosstalk blocking portion may be provided on at least one of the receptacle connector or the plug connector. In addition, the crosstalk blocking portions provided on the receptacle connector or the plug connector may be arranged linearly to be aligned with each other in the longitudinal direction, or may be arranged to be misaligned from each other on the receptacle metal shell (or plug metal shell) separated from each other. In addition, when the crosstalk blocking portions are arranged to be misaligned in the longitudinal direction, parts of the crosstalk blocking portions may be preferably arranged to overlap each other in the width direction, such that crosstalk is blocked in a gap between the crosstalk blocking portions.

Although exemplary embodiments of the present disclosure have been illustrated and described as above, various changes and other embodiments can be implemented by those skilled in the art. It should be noted that such changes and other embodiments are considered and included in the appended claims, and do not depart from the genuine purpose and the scope of the present disclosure.

The invention claimed is:

1. A receptacle connector for connection with a plug connector to electrically connect one pair of boards, the receptacle connector comprising:

an insulative receptacle housing comprising a bottom portion, first sidewall portions protruding along first opposite side borders of the bottom portion and facing each other, the first sidewall portions extending along a longitudinal direction of the receptacle housing, a second sidewall portions protruding along second opposite side borders of the bottom portion and facing each other, each second sidewall portion being connected with each first sidewall portion, a center protrusion portion protruding from a center of the bottom portion and extending along the longitudinal direction, and a connection recess portion formed between the sidewall portions and the center protrusion portion, each sidewall portion having an inner surface facing the center protrusion portion, an opposite outer surface, and upper and lower surfaces extending between the inner and outer surfaces;

a plurality of conductive receptacle terminals extending into the connection recess portion, each of the receptacle terminals being configured to contact a conductive terminal of the plug connector through a single contact point; and a receptacle metal shell comprising fitting nail portions coupled to the second sidewall portions, a crosstalk blocking portion extended from at least one of the fitting nail portions and along the center protrusion portion to separate the receptacle terminals on both sides facing each other and to block crosstalk between the receptacle terminals, and noise blocking portions extending over the outer surfaces of the first sidewall portions to block external noise, wherein the receptacle metal shell is electrically isolated from the conductive receptacle terminals by the insulative receptacle housing and is configured to be soldered to one of the boards to fix the receptacle housing to the one board.

2. A plug connector for connection with a receptacle connector to electrically connect one pair of boards, the plug connector comprising:

an insulative plug housing comprising a bottom portion, a first sidewall portions protruding along first opposite side borders of the bottom portion and facing each other, the first sidewall portions extending along a longitudinal direction of the plug housing, a second sidewall portions protruding along second opposite side borders of the bottom portion and facing each other and each second sidewall portion being connected with each first sidewall portion, and a connection recess portion formed between the sidewall portions and, each sidewall portion having an inner surface facing the connection recess portion, an opposite outer surface, and upper and lower surfaces extending between the inner and outer surfaces;

a plurality of conductive plug terminals coupled along the inner surfaces of the first sidewall portions, each of the plug terminals being configured to contact a conductive terminal of the receptacle connector through a single contact point; and a plug metal shell comprising fitting nail portions coupled to the second sidewall portions, a crosstalk blocking portion extended from at least one of the fitting nail portions and along the connection recess portion to separate the plug terminals on both sides facing each other and to block crosstalk between the plug terminals, and noise blocking portions extending over the outer surfaces of the first sidewall portions to block external noise, wherein the plug metal shell is electrically isolated from the conductive plug terminals by the insulative plug housing and is configured to be soldered to one of the boards to fix the plug housing to the one board.

3. A board-to-board connector which electrically connects a first board and a second board comprising:

a receptacle connector including an insulative receptacle housing comprising a first bottom portion, first sidewall portions protruding along first opposite side borders of the first bottom portion and facing each other, the first sidewall portions extending along a longitudinal direction of the receptacle housing, second sidewall portions protruding along second opposite side borders of the first bottom portion and facing each other, each second sidewall portion being connected with each first sidewall portion, a center protrusion portion protruding from a center of the first bottom portion and having a plate insertion recess formed on a center thereof, the center protrusion portion extending along the longitudinal direction, and a first connection recess portion formed between the sidewall portions and the center protrusion portion, each sidewall portion having an inner surface facing the center protrusion portion, an opposite outer surface, and upper and lower surfaces extending between the inner and outer surfaces, a receptacle metal shell configured to be soldered to the first board to fix the receptacle housing to the first board, and a plurality of conductive receptacle terminals extending into the first connection recess portion; and a plug connector including an insulative plug housing comprising a second bottom portion, third sidewall portions protruding along first opposite borders of the second bottom portion and facing each other, the third sidewall portions extending along a longitudinal direction of the plug housing; fourth sidewall portions protruding along second opposite side borders of the second bottom portion and facing each other, each fourth sidewall portion being connected with each third sidewall portion, and a second connection recess portion formed between the third and fourth sidewall portions, a plug metal shell configured to be soldered to the second board to fix the plug housing to the second board, and the plug metal shell having a first crosstalk blocking portion which is inserted into the plate insertion recess, a plurality of conductive plug terminals extending into the second connection recess portion; and wherein, when the receptacle connector and the plug connector are coupled to each other, respective plug terminals engage with respective receptacle terminals to form mating contacts, the first crosstalk blocking portion is inserted into the plate insertion recess, and the first crosstalk blocking portion prevents crosstalk.

4. The board-to-board connector of claim 3, wherein the receptacle metal shell comprises a first fitting nail portion coupled to the second sidewall portion, and first noise blocking portions extended from both sides of the first fitting nail portion to be coupled to the first sidewall portions of an area where the receptacle terminals are positioned.

5. The board-to-board connector of claim 4, wherein the plug metal shell comprises a second fitting nail portion coupled to the fourth sidewall portion, and second noise blocking portions extended from both sides of the second fitting nail portion to be coupled to the third sidewall portions of an area where the plug terminals are positioned.

6. The board-to-board connector of claim 5, wherein the first noise blocking portion and the second noise blocking portion contact with each other when the receptacle connector and the plug connector are coupled to each other.

7. The board-to-board connector of claim 6, wherein a first contact projection is formed on a facing surface of one of the first noise blocking portion or the second noise blocking portion.

8. The board-to-board connector of claim 7, wherein a contact recess is formed on a facing surface of the other of the first noise blocking portion or the second noise blocking portion to receive the first contact projection.

9. The board-to-board connector of claim 3, wherein the receptacle metal shell further comprises a second crosstalk blocking portion, and the first crosstalk blocking portion faces the second crosstalk blocking portion when the receptacle connector and the plug connector are coupled to each other.

10. The board-to-board connector of claim 9, wherein the first crosstalk blocking portion and the second crosstalk blocking contact each other when the receptacle connector and the plug connector are coupled to each other.

11. The board-to-board connector of claim 10, wherein a second contact projection is formed on a facing surface of one of the first crosstalk blocking portion or the second crosstalk blocking portion.

12. The board-to-board connector of claim 3, wherein the receptacle metal shell and the plug metal shell are configured as one pair of separable portions facing each other in the longitudinal direction and separable from each other.

13. The board-to-board connector of claim 3, wherein the receptacle terminal comprises a first connection portion configured to come into contact with the first board, and a first contact portion bent and extended from the first connection portion; and wherein the plug terminal comprises a second connection portion configured to come into contact with the second board, and a second contact portion bent and extended from the second connection portion, and wherein the first contact portion and the second contact portion come into contact with each other through a single contact point to form a linear signal transmission path.

14. The receptacle connector of claim 1, wherein the fitting nail portions extend over the upper surface and over the outer surface of the of the respective second sidewall portion.

15. The receptacle connector of claim 1, wherein the fitting nail portions are coupled to the noise blocking portions.

16. The plug connector of claim 2, wherein the fitting nail portions extend over the lower surface and over the outer surface of the of the respective second sidewall portion.

17. The plug connector of claim 2, wherein the fitting nail portions are coupled to the noise blocking portions.

* * * * *